(12) United States Patent
Nikkanen

(10) Patent No.: US 7,627,240 B2
(45) Date of Patent: Dec. 1, 2009

(54) OPTICAL DEVICE WITH IMPROVED AUTOFOCUS PERFORMANCE AND METHOD RELATED THERETO

(75) Inventor: Jarno Nikkanen, Tampere (FI)

(73) Assignee: Nokia Corporation, Espoo (FI)

( * ) Notice: Subject to any disclaimer, the term of this patent is extended or adjusted under 35 U.S.C. 154(b) by 411 days.

(21) Appl. No.: 11/391,722

(22) Filed: Mar. 27, 2006

(65) Prior Publication Data

US 2007/0223905 A1    Sep. 27, 2007

(51) Int. Cl.
G03B 3/10 (2006.01)
G03B 13/34 (2006.01)

(52) U.S. Cl. ................... 396/130; 348/208.12

(58) Field of Classification Search ............... 396/130; 348/208.1, 208.12, 208.14
See application file for complete search history.

(56) References Cited

U.S. PATENT DOCUMENTS

| | | | |
|---|---|---|---|
| 6,710,950 B2 * | 3/2004 | Rouvinen et al. | 359/824 |
| 2004/0057613 A1 * | 3/2004 | Noto et al. | 382/154 |
| 2005/0128335 A1 * | 6/2005 | Kolehmainen et al. | 348/340 |
| 2007/0031136 A1 * | 2/2007 | Kakkori | 396/89 |

FOREIGN PATENT DOCUMENTS

| JP | 8-75987 | 3/1996 |
|---|---|---|
| JP | 2002-72059 | 3/2002 |

OTHER PUBLICATIONS

English Translation of the Detailed Description of JP 8-75987 A from Japanese Patent Office Website, Printed Jul. 7, 2008.*
Patent Abstracts of Japan, Publication No. JP 08 075987, Publication Date: Mar. 22, 1996.
Patent Abstracts of Japan, Publication No. .JP 2002 072059, Publication Date: Mar. 12, 2002.

* cited by examiner

*Primary Examiner*—Christopher Mahoney

(57) ABSTRACT

A device, method and a computer program product are shown for correcting the focus error in an optical device, wherein in a first position of the optical device at least one focus detector is focused onto a given image plane of the target subject and the distance ($d_1$) between the optical device and the given image plane is locked and wherein in a second position of the optical device following a reorientation of the optical device for achieving the desired framing of the image the shutter is released, the method comprising sensing a distance vector parallel to the focus plane after reorientation between the first position and the second position after reorientation, calculating a focus correction value ($d_e$) from the sensed distance vector and adding the focus correction value ($d_e$) as a corrective to the locked focus distance ($d_1$).

10 Claims, 3 Drawing Sheets

OPTICAL DEVICE WITH IMPROVED AUTOFOCUS PERFORMANCE AND METHOD RELATED THERETO

FIELD OF THE INVENTION

The present invention relates to a method, a device and an algorithm directed to an improved auto-focus performance in an optical device, like a camera.

BACKGROUND OF THE INVENTION

Optical imaging devices, like Single-Lens-Reflex (SLR) cameras, which are widely used in the field of photography, are usually equipped with an auto-focus system, by which the camera lens system automatically focuses the image on a selected part of the target subject. The detector for accomplishing the auto-focus (AF) function is usually located at the center of the frame because this position is generally more sensitive and more accurate than the other parts of the frame. Moreover, the center location for AF sensor is also preferred for usability reasons, and because it is more difficult for the peripheral areas to achieve the same optical performance as the center.

Under those circumstances, in which the part of the subject which should be focused, is not in coincidence with the center of the frame, a so-called "focus-recompose technique" is widely used. This technique involves the steps of firstly placing the central auto-focus detector on the portion of the subject that needs to be most clearly focused and activating, i.e. locking, the auto-focus in this first position of the camera.

Once the focus-lock has been activated, the camera is reoriented in a second step until the desired framing is achieved and finally the shutter of the camera is released in this second position.

The technical disadvantages of this known "focus and recompose" technique become apparent when the target subject goes out of the depth of field of the camera, e.g. in those applications which are directed to shallow depth of field situations, like portrait photography. The target object, on which the focus was locked in phase one, will shift away from the plane of focus as the camera is reoriented in phase two.

In order to circumvent the disadvantages associated with the focus-and-recompose-technique, it is already known from practical examples, e.g. from the single lens-reflex (SLR) camera type Canon EOS 20D, to use a variety of focus detectors instead of just one central focus detector to be able to skip the reorientation phase after focus lock. In these types of cameras it is advised in its technical descriptions to manually select one specific of the several focus detectors, e.g. that focus point which is already on top of the target subject.

However, the disadvantage of utilizing several focus detectors is that this procedure is typically not as fast and that it is not as easy to select the different focusing points compared to the use of a single central focus point.

Another disadvantage is that in many cameras the focus points outside the central focus point are not as accurate and sensitive, which leads to the result that in low-light conditions the focus cannot be locked by another than the central focus point. Thus, a larger focusing error results from using a less accurate auto-focus sensor.

SUMMARY OF THE INVENTION

In view of the above mentioned problem, it is, inter alia an object of the present invention to improve the focus performance of an optical device like a camera, a method for using this camera and a program algorithm to be implemented in such a camera.

Furthermore, the invention is intended to solve or reduce the focus error problems that are associated with the known focus-and-recompose-technique.

An optical device is proposed with improved autofocus performance comprising a housing, at least one lens unit, a storing medium for storing the image of the target subject, a focusing unit using at least one focus detector for focusing a given image plane of the target subject onto the optical device, the focusing unit comprising focus lock means for locking the focus distance ($d_1$) between the optical device and the given focus plane in a first camera position and means for releasing a shutter in a second camera position following a reorientation of the optical device for achieving the desired framing of the image, wherein the focusing unit comprises a focus distance correction unit comprising sensing means for sensing the distance vector being parallel to the focus plane after reorientation, i.e. the difference between the first camera position and the second camera position, calculating means for calculating a focus correction value ($d_e$) from the sensed distance vector and adding means for addition of the focus correction value ($d_e$) to the locked focus distance ($d_1$).

It is the central teaching of the present invention that the focus distance is automatically corrected by the focus correction value ($d_e$) when the camera is reoriented into the second position after focus lock in the first position to achieve the desired framing. It should be noted here that the spatial coordinates of the distance vector refer to the 2D coordinates of the target area of the image scene (on which the focus was locked in the first camera position) that is projected on the focus plane.

The solution according to the invention is easy to implement and very cost-effective to realize. The present invention may be implemented in any type of advanced camera systems, e.g. cameras, which are able to produce a shallow depth of field. This type of photography is preferred in the field of portrait photography: when keeping the target subject focused while keeping the background blurred at the same time, the target subject is separated from the background in a nice looking manner. The invention can also be implemented in optical devices capable of macro photography where shallow depths of field can be achieved also with small camera sensors and optics. Thus, the very fast and effective focusing technique which the "focus and recompose method" takes advantage from, can be maintained for arbitrary applications by using only one central focus sensor. It is also in some cases possible to make the center AF sensor even more sensitive and more accurate, since the cost of the other AF sensors is reduced or removed.

In a preferred embodiment of the invention, the sensing means is a means for obtaining the projected distance $d_2$ between the focus plane after reorientation and the given focus plane in which the focus is locked. In this embodiment, the focus correction value $d_e$ is calculated according to the equation $$d_e = d_1 - \sqrt{d_1^2 - d_2^2}$$

More specifically, the means for obtaining the distance $d_2$ between the focus plane after reorientation and the given focus plane in which the focus is locked comprise analyzing means for analyzing the movement of the target subject within a given image framing. Even more specifically, when the optical device is a digital single lens reflex (SLR) camera or digital still camera (DSC) comprising a CMOS image sensor, the analysis of the movement of the target subject is based on the evaluation of raw frames which are continuously received from the image sensor after focus lock. Further specifically, the raw frames may be downscaled in the image sensor. Electronic shutter, e.g. rolling shutter, can be used when exposing the continuously received tracking frames. In case that the target area moves both in horizontal and in vertical directions in the image plane, then $d_2=\sqrt{d_{2,x}^2+d_{2,y}^2}$ is applicable, where $d_{2,x}$ and $d_{2,y}$ are the offsets of the target area coordinates from the center in horizontal and vertical directions, respectively. It is straightforward for one skilled in the art to make mapping from movement that is detected from the consecutive camera sensor frames (measured e.g. in pixels) into movement that is projected on the plane of focus (measured e.g. in millimeters).

The option described above is of specific importance for digital cameras because typically frames of the raw type, i.e. frames which are not processed/compressed before being received from the image sensor, are anyway captured continuously for the view finder. There are a lot of different motion estimation methods available that can be used in this case for analyzing the raw image frames to determine subject movements. It should be noted, however, that compared to the motion estimation used for e.g. video coding, in this specific case a more coarse motion estimation is sufficient.

Alternatively, the sensing means is a means for obtaining the rotational angle α of the camera resulting from the reorientation of the camera and that the focus correction value $d_e$ is calculated according to the equation $$d_e = d_1 - d_1 \cdot \cos \alpha.$$

This type of sensor can e.g. be an accelerometer which keeps track of the camera movement during reorientation after the focus lock in the first camera position thus obtaining easily the rotation angle α.

Further proposed is a method for correcting the focus error in an optical device, wherein in a first position of the optical device at least one focus detector is focused onto a given image plane of the target subject and the distance ($d_1$) between the optical device and the given focus plane is locked and wherein in a second position of the optical device following a reorientation of the optical device for achieving the desired framing of the image the shutter is released, said method comprising:

sensing a distance vector being parallel to the focus plane after reorientation between the first position and the second position after reorientation, calculating a focus correction value ($d_e$) from the sensed distance vector and adding the focus correction value ($d_e$) as a corrective to the locked focus distance ($d_1$).

Summarizing, the advantages of the present invention are:

Maintaining the auto-focus accuracy because only one central focus detector is used.

The well-known "Focus and recompose" technique of focusing may be used which is faster to adapt than the manual selection of specific focusing points.

In addition to that, it should be noted here that the "focus and recompose" technique has been widely used especially with traditional, non-digital SLR. Nonetheless, the present invention is also applicable for digital single lens reflex (SLR) cameras, wherein the storage medium is a CMOS image sensor.

These and other aspects of the invention will be apparent from and elucidated with reference the embodiment described hereinafter.

DETAILED DESCRIPTION OF THE INVENTION

Figure 1:
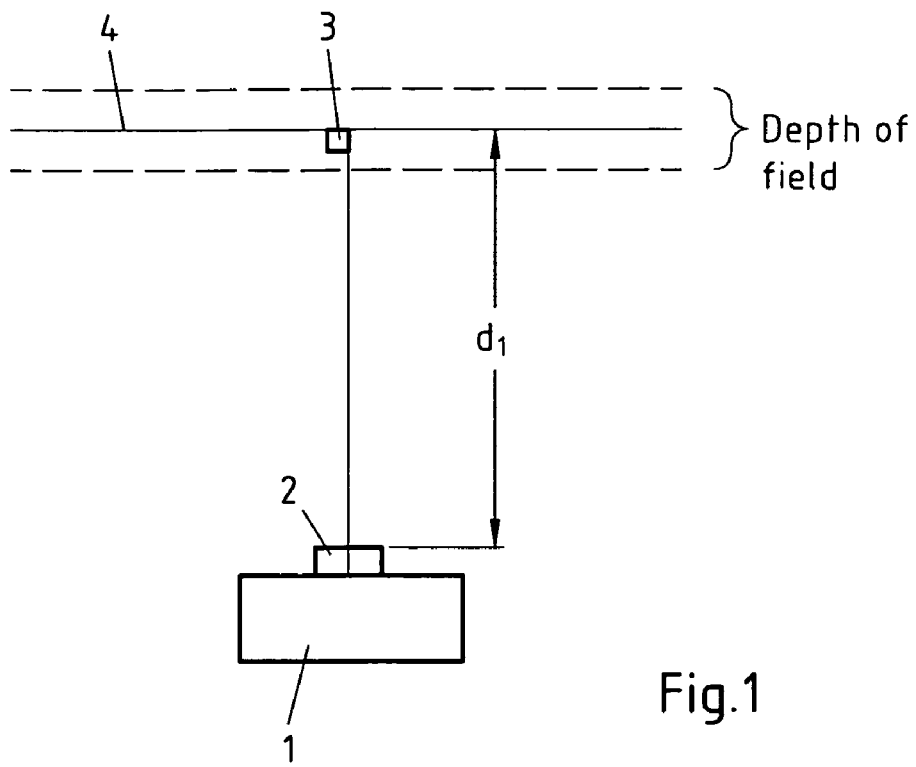
FIG. 1: a schematic diagram of a device according to the present invention in a first position.

The optical imaging device according to the preferred embodiment of the present invention comprises a camera housing 1 and at least one lens unit 2 to be mounted to the camera housing 1. Moreover, an optical storage unit is comprised in the camera, which can be an optical film in traditional ("non-digital") cameras or a processor receiving digital signals from a CMOS image sensor 41 to be used in a digital camera. A generalized image device may for instance include an image sensing arrangement comprising the lens assembly 2 and an image sensor. The imaging sensing arrangement captures an image and converts the captured image into an electrical form. Or, it can be captured on film. If done electrically, the electrical signal produced by the apparatus is led to an analog to digital converter 43 which converts the analog signal into a digital form. From the converter the digitized signal is taken into a signal processor 45 where it is processed to create an image file. The output signal of the image sensing arrangement contains raw image data which needs post processing so that the signal processor is responsible for that as well as for example giving exposure control commands and focus commands to the image sensing arrangement. The device may further comprise an image memory 45a where the signal processor may store finished images, a work memory 45b for data and program storage, a display and a user interface. All of this is well known in the art and is shown for example in U.S. Patent Publication 2005/0128335 assigned to the assignee hereof.

The camera device further includes a focusing unit 42 which comprises a focus detector for focusing the camera device onto a given image plane 4 of the target subject 3. The focus detector is located in the center of the frame determined by the viewfinder of the camera. Moreover, the camera device comprises a shutter after the release of which the target subject is projected to be permanently or temporarily stored on or in the optical storage unit. Such Focusing units are known in the art for example as shown in U.S. Pat. No. 6,710,950 of the Assignee hereof, particularly at Fig. 3 which shows a block diagram of such a focusing unit which is mentioned merely for general background purposes and not by way of limitation. The illustration of FIG. 4 hereof is another non-limiting block diagram showing an arrangement of an optical device according to the invention.

Figure 2:
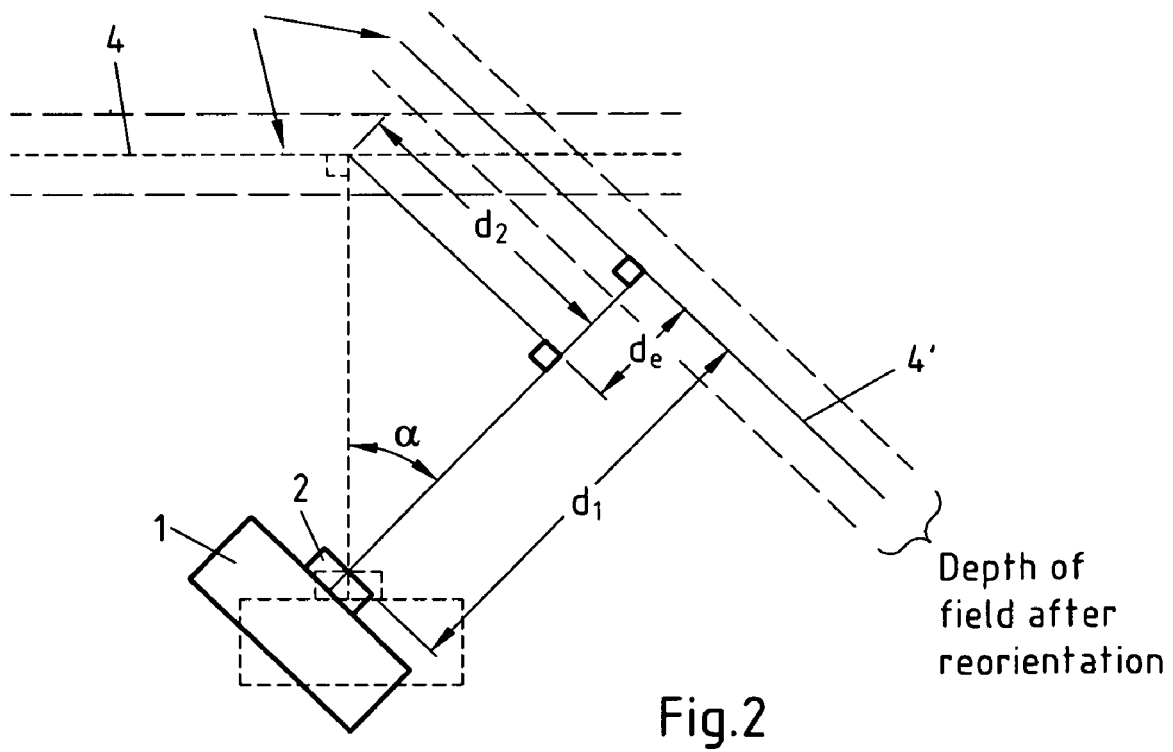
FIG. 2: a schematic diagram of the device in Fig. 1 in a second position.

The preferred embodiment of the present invention comprises an improved auto-focus performance which is described now in detail with reference to the sketches of FIG. 1 and Fig. 2. Such improved auto-focus performance may be accomplished by means of a focus distance correction unit comprised within the camera device in conjunction with or within the above-described focusing unit 42. Such may also include the above mentioned focus lock device 48 for locking the focus distance between the optical device and the given focus plane in a first camera position and a device 50 for releasing a shutter 51 in a second camera position following a reorientation of the optical device for achieving the desired framing of the image.

Figure 3:
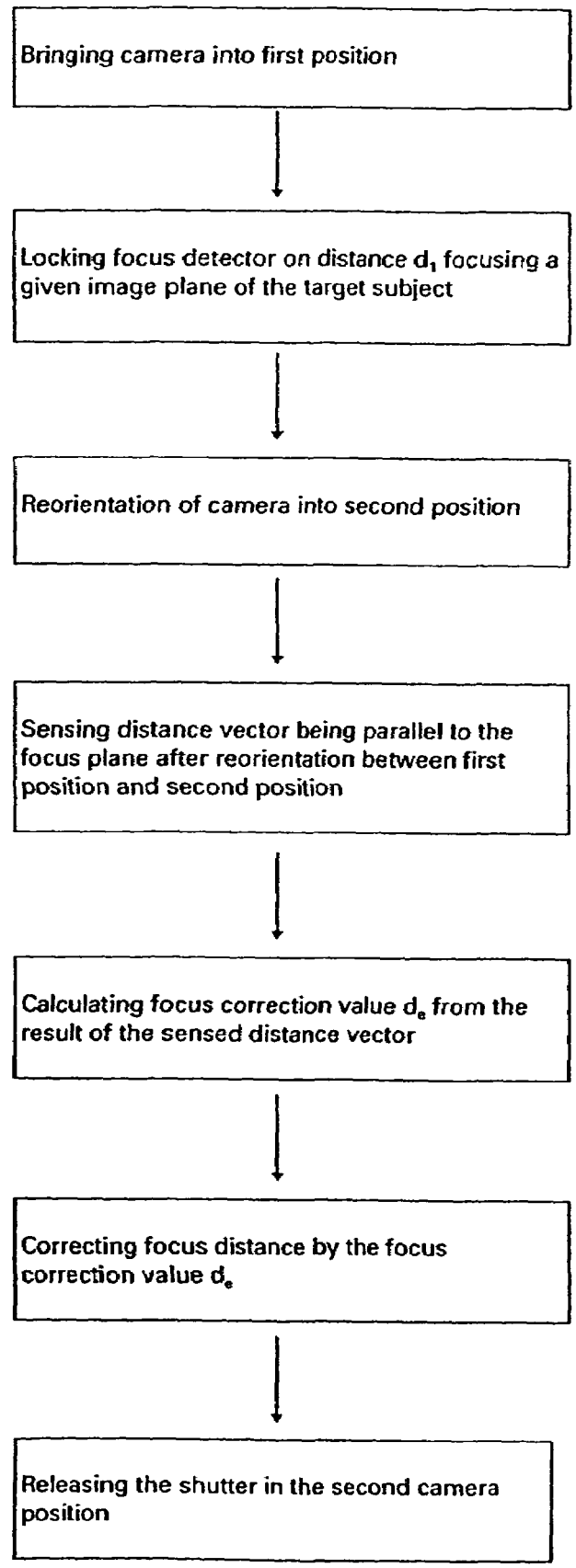
FIG. 3: a flowchart illustrating a method.
Figure 4:
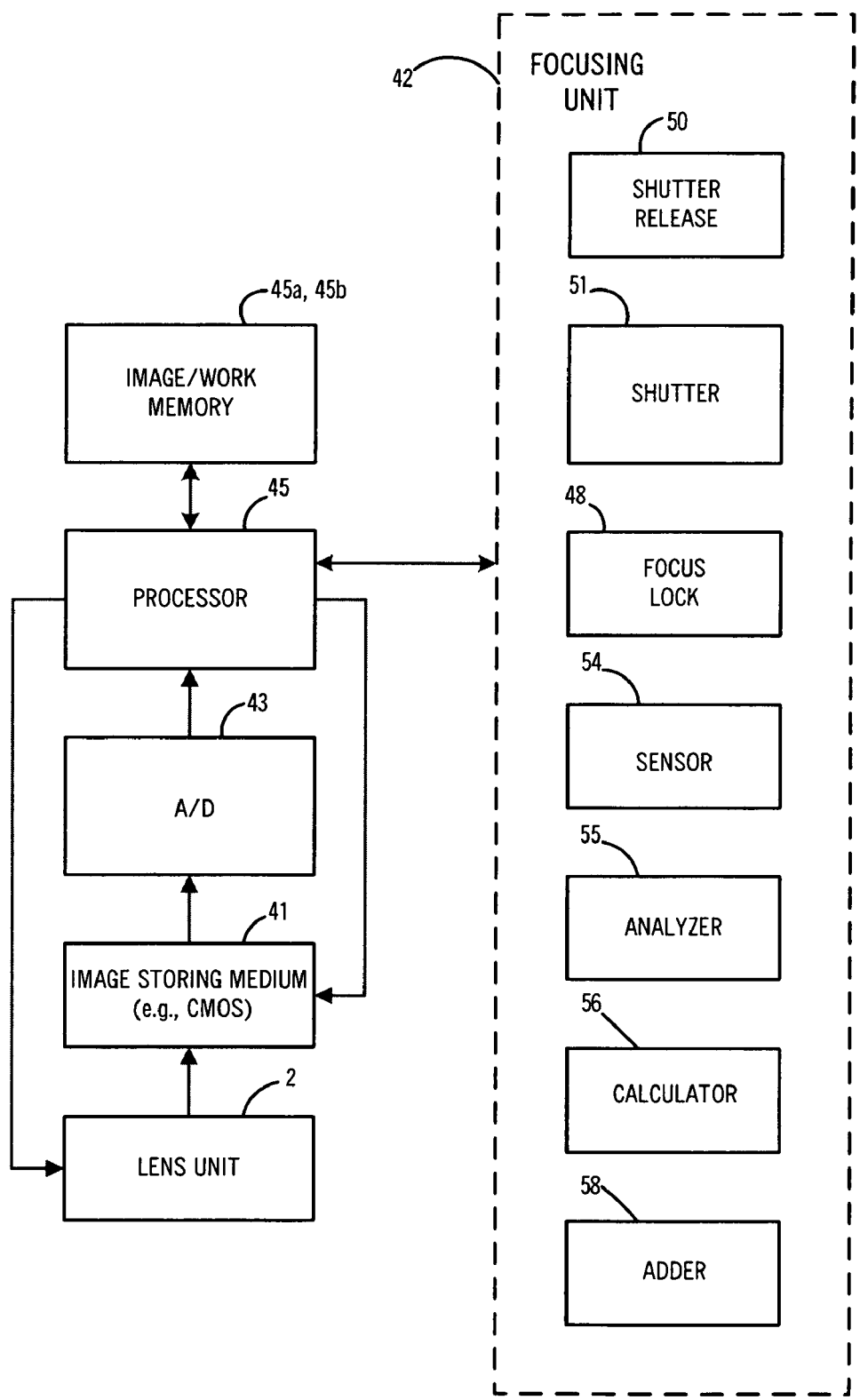
FIG. 4: a simplified block diagram of an optical device with improved autofocus performance according to an embodiment of the present invention.

FIG. 3 is a flowchart showing a method for correcting the focus error in an optical device. It should be realized that although the certain steps are shown in sequence, they are not necessarily carried out in the sequence shown and variations are of course contemplated.

In a first position of the camera 1, which is shown in FIG. 1 and the first step of FIG. 3, the central focus detector is directed to the target subject 3, especially to that part of the target subject 3 which should be presented most clearly. As can be seen from the dotted lines in FIG. 1, the focusing unit operates so that the target subject 3 lies within the DOF (Depth of field) of the camera system. In this position, the distance of the given focus plane 4 through the target subject 3 and the camera 1 is defined by the distance ($d_1$). In this position the focus is locked, as shown in the second step of FIG. 3, which means that the focus distance is fixed to the value $d_1$.

FIG. 2 refers to circumstances after which the camera has been reoriented from the first position shown in FIG. 1 to a second position shown in FIG. 2 and in the third step of FIG. 3. (It is to be noted that the amount of rotation is exaggerated for a better illustration in FIG. 2).

The reorientation of the camera has been due either because of the fact that the subject to be targeted does not coincide with the central point of focus in the frame or, alternatively, that the target subject 3 moved out of the central focus position after locking of the focus. It may seen from a comparison of the dotted lines (corresponding to the depths of field, DOF,) that the target subject 3 wanders out of the depth of focus due to camera reorientation (as indicated by the arrows in FIG. 2).

The distance vector being parallel to the focus plane after reorientation, i.e. the projected difference between the first camera position of FIG. 1 and the second camera position of FIG. 2 can be either represented by the distance ($d_2$) or by the angle α.

If the track of the camera during reorientation was followed by the distance ($d_2$), the focus distance error ($d_e$) may be calculated to $$d_e = d_1 - \sqrt{d_1^2 - d_2^2} \quad (1)$$

Alternatively, if the track of the camera during reorientation was followed by the rotation angle α, the focus distance error ($d_e$) is calculated to be $$d_e = d_1 - d_1 \cdot \cos α. \quad (2)$$

In both cases, the corrected focus distance is achieved by moving the focus distance ($d_1$) closer by the amount of distance ($d_e$).

The first option to calculate the camera reorientation based on following the distance ($d_2$) is described now in detail:

After the focus has been locked in the first position, raw, e.g. unprocessed or adequately processed, image frames are received from the camera image sensor continuously and the movement of the target subject is analyzed from motion estimation of the image framing which is a common technology, for example for video encoding. For an ease of the data flow the raw frames may be downscaled in the sensor.

Following this process the distance ($d_2$) from the center of the given focus plane in which the focus is locked to the center of the focus plane after reorientation is easily obtained. From this, the correction value $d_e$ may be calculated from equation 1.

Alternatively, the track of the camera movement from the first to the second position can be followed by using an accelerometer sensor resulting in the value for the rotation angle α which can thus be processed according to equation 2.

The optical device according to the invention and as described above may therefore also include a focus distance correction unit comprising sensing means 54 for sensing the distance vector being parallel to the focus plane after reorientation between the first camera position and the second camera position. The sensing operation is shown in the fourth step of FIG. 3 and may include analyzing movement of the target. Such analysis of movement may be provided by an analyzer 55. In addition, a calculating device 56 may be provided for calculating a focus correction value ($d_e$) from the sensed distance vector. A calculating step is shown in the fifth step of FIG. 3. The focus correction value ($d_e$) may be added to the locked focus distance ($d_1$) by an adder device 58. A correcting step is shown in the sixth step of FIG. 3.

In a final step the shutter is released in the second camera position.

It should be realized that the above described method may be carried out by a computer program stored on a computer readable medium with instructions operable to cause a processor to perform the described method steps.

The invention described above can easily be implemented into camera phones that have macro-capability or otherwise a possibility to get shallow depths of field.

The invention has been described above by means of an exemplary embodiment. It should be noted, however, that there are alternative ways and variations which are obvious to a skilled person in the art and can be implemented without deviating from the scope and spirit of the appended claims.

The invention claimed is:

1. An optical device with improved autofocus performance comprising:

a housing, at least one lens unit, a storing medium for storing an image of a target subject, a focusing unit using at least one focus detector for focusing a given image plane of the target subject onto the optical device, the focusing unit comprising a focus lock for locking a focus distance ($d_1$) between the optical device and the given focus plane in a first camera position, and a shutter release for releasing a shutter in a second camera position following a reorientation of the optical device for achieving the desired framing of the image, wherein the focusing unit comprises a focus distance correction unit comprising a sensor for sensing a distance vector being parallel to the focus plane after reorientation between the first camera position and the second camera position, a calculator for calculating a focus correction value ($d_e$) from the distance vector, an adder for addition of the focus correction value ($d_e$) to the locked focus distance ($d_1$), wherein the sensor is for obtaining the distance ($d_2$) between a center of the focus plane after reorientation and a center of the given focus plane in which the focus is locked and wherein said device comprises an analyzer for analyzing the movement of the target subject within a given image framing, wherein the storing medium comprises an image sensor and analysis of movement of the target subject is based on raw frames which are continuously received from and downscaled in the image sensor after focus lock.

2. The device according to claim 1, wherein the focus correction value ($d_e$) is calculated from the locked focus distance ($d_1$) and the distance ($d_2$) between the center of the focus plane after reorientation and the center of the given focus plane in which the focus is locked using Pythagorean's theorem.

3. The device according to claim 2, wherein the optical device is a digital single lens reflex camera and the image sensor is a complementary metal oxide semiconductor image sensor.

4. The device according to claim 1, wherein the optical device is a single lens reflex camera.

5. The device according to claim 1, wherein the optical device is a digital single lens reflex camera and wherein the storage medium is processor including the image sensor, wherein the image sensor is a complementary metal oxide semiconductor image sensor.

6. The device according to claim 1, wherein the optical device is capable of macro photography.

7. The device according to claim 1, wherein the focus detector is located at a center of the frame.

8. A method for correcting a focus error in an optical device, the optical device comprising a storing medium for storing an image of a target subject, wherein the storing medium comprises an image sensor, wherein in a first position of the optical device at least one focus detector is focused onto a given image plane of the target subject and a focus distance between the optical device and a given image plane is locked and wherein in a second position of the optical device following a reorientation of the optical device for achieving a desired framing of an image a shutter is released, said method comprising:

sensing a distance vector parallel to a focus plane after reorientation between the first position and the second position after reorientation, calculating a focus correction value from the sensed distance vector, adding the focus correction value as a corrective to the locked focus distance, and analyzing movement of the target subject within a given image framing, wherein the analysis of the movement of the target subject is based on raw frames which are continuously received from and downscaled in the image sensor after focus lock.

9. A computer program stored on a computer readable medium with instructions operable to cause a processor to perform the method steps of claim 8.

10. Apparatus for correcting a focus error in an optical device, the optical device comprising means for storing an image of a target subject, the means for storing an image of a target subject comprising an image sensor, wherein in a first position of the optical device at least one focus detector is focused onto a given image plane of the target subject and a focus distance between the optical device and a given image plane is locked and wherein in a second position of the optical device following a reorientation of the optical device for achieving a desired framing of an image a shutter is released, said apparatus comprising:

means for sensing a distance vector parallel to a focus plane after reorientation between the first position and the second position after reorientation;

means for calculating a focus correction value from the sensed distance vector; and means for adding the focus correction value as a corrective to the locked focus distance, and analyzing movement of the target subject within a given image framing, wherein the analysis of the movement of the target subject is based on raw frames which are continuously received from and downscaled in the image sensor after focus lock.

* * * * *

UNITED STATES PATENT AND TRADEMARK OFFICE
CERTIFICATE OF CORRECTION

PATENT NO. : 7,627,240 B2  Page 1 of 1
APPLICATION NO. : 11/391722
DATED : December 1, 2009
INVENTOR(S) : Jarno Nikkanen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 649 days.

Signed and Sealed this

Twenty-first Day of December, 2010

David J. Kappos
*Director of the United States Patent and Trademark Office*